Patented July 13, 1943

2,324,287

UNITED STATES PATENT OFFICE 2,324,287

DIAZINE DERIVATIVES

Gaetano F. D'Alelio, Pittsfield, Mass., assignor to General Electric Company, a corporation of New York No Drawing. Application April 7, 1942, Serial No. 437,943

16 Claims. (Cl. 260—251)

This invention relates to new chemical compounds and more particularly to diazine derivatives. The invention especially is concerned with the production of new and useful compounds corresponding to the following general formula:

I
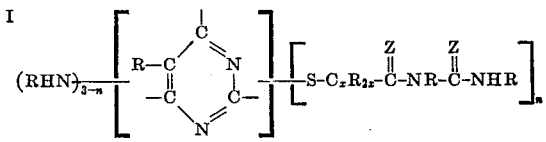

where $n$ represents an integer and is at least 1 and not more than 3, $x$ is an integer and is at least 1 and not more than 2, Z represents a member of the class consisting of oxygen and sulfur, and R represents a member of the class consisting of hydrogen and monovalent hydrocarbon and substituted hydrocarbon radicals, more particularly halo-hydrocarbon radicals. The compounds embraced by the above formula are diazinyl thio acyl or thio thionoacyl ureas or thioureas. From a consideration of the formula it will be seen that when $n$ is 3 there will be no amino (—NHR) groups attached to the diazine nucleus.

Illustrative examples of monovalent radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc., including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in Formula I is hydrogen.

However, there also may be produced in accordance with the present invention compounds such, for instance, as those represented by the general formulas:

II
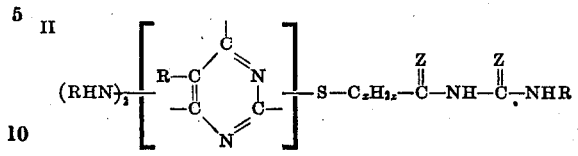

and, more particularly,

III
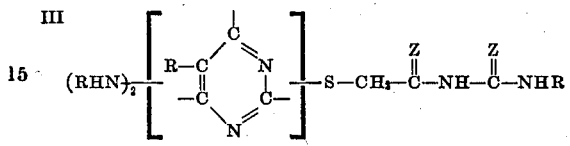

where $x$, Z and R have the same meanings as given above with reference to Formula I.

The new compounds of this invention may be used, for example, as pharmaceuticals, plasticizers, fungicides, insecticides, as an intermediate in the preparation of dyes and other chemical compounds, for instance imido ether, amidine, hydrazino, methylol, etc., derivatives, and for other purposes. These new compounds are especially valuable in the preparation of synthetic resinous compositions. Thus, they may be condensed with, for example, aldehydes, including polymeric aldehydes, hydroxy aldehydes and aldehyde-addition products, to yield condensation products of particular utility in the plastics and coating arts. Such condensation products are more fully described and are specifically claimed in my copending application Serial No. 441,372, filed May 1, 1942, and assigned to the same assignee as the present invention. These new compounds or their aldehyde-addition products also may be compounded with rubber, both natural and synthetic, to modify the properties of the rubber.

Various methods may be employed to produce the chemical compounds of this invention. I prefer to prepare them by effecting reaction between a mercapto diazine and a mono-halogenated acylated or thionoacylated urea or thiourea in the presence of a hydrohalide acceptor. Illustrative examples of mercapto diazines, more particularly mercapto pyrimidines, that may be used, depending upon the particular end-product desired, are:

2-mercapto 4,6-diamino pyrimidine
4-mercapto 2,6-diamino pyrimidine
2-mercapto 4,6-diamino 5-methyl pyrimidine
4-mercapto 2,6-diamino 5-ethyl pyrimidine
2,4-dimercapto 6-amino pyrimidine
4,6-dimercapto 2-amino pyrimidine
2,4-dimercapto 5-phenyl 6-amino pyrimidine
2,4,6-trimercapto pyrimidine
2,4,6-trimercapto 5-methyl pyrimidine
2,4,6-trimercapto 5-cyclohexyl pyrimidine
2-mercapto 4,6-di-(methylamino) pyrimidine
4-mercapto 2,6-di-(cyclohexylamio) pyrimidine
2-mercapto 4,6-di-(toluido) pyrimidine
2-mercapto 4-methylamino 5-chlorophenyl 6-benzylamino pyrimidine
2,4-dimercapto 6-naphthylamino pyrimidine
2,4-dimercapto 5-tolyl 6-ethylamino pyrimidine
4,6-dimercapto 2-chloroanilino 5-propyl pyrimidine
2-mercapto 4,6-di-(anilino) pyrimidine
2-mercapto 4,6-di-(propylamino) pyrimidine
4-mercapto 2,6-di-(toluido) pyrimidine
2-mercapto 4-allylamino 5-xenyl 6-butylamino pyrimidine
2-mercapto 4-isobutylamino 5-iodophenyl 6-cyclopentylamino pyrimidine
2-mercapto 4,6-di-(3'-butenylamino) pyrimidine
2,4-dimercapto 6-iodoanilino pyrimidine
4,6-dimercapto 2-bromoethylamino pyrimidine
2-mercapto 4-cylohexenylamino 5-butenyl 6-naphthylamino pyrimidine
2-mercapto 4-bromotoluido 5-cyclohexyl 6-benzylamino pyrimidine
2-mercapto 4-phenylchloroethylamino 5-methyl 6-phenethylamino pyrimidine
2,4-dimercapto 6-cycloheptylamino pyrimidine
2,4-dimercapto 6-chloroethylamino pyrimidine
4,6-dimercapto 2-fluoroaniline pyrimidine
2-mercapto 4-dichloroanilino 6-chloroethylamino pyrimidine
2-mercapto 4-amino 5-cyclohexenyl 6-bromopropylamino pyrimidine
4-mercapto 2-methylamino 5-ethyl 6-propylamino pyrimidine
2-mercapto 4-amino 6-naphthylamino pyrimidine
2,4-dimercapto 6-methylamino pyrimidine
4,6-dimercapto 2-ethylamino 5-isobutyl pyrimidine Illustrative examples of mono-halogenated acylated and thionoacylated ureas and thioureas that may be employed, depending upon the particular end-product desired, are:

Chloroacetyl urea
Chlorothionoacetyl urea
Bromoacetyl urea
Bromothionoacetyl urea
Chlorothionoacetyl thiourea
Iodoacetyl urea
Chloroacetyl thiourea
Bromoacetyl thiourea
Iodoacetyl thiourea
Alpha-chloropropionyl urea
Beta-choloropropionyl urea
Alpha-chlorobutyryl urea
Beta-bromobutyryl urea
N-chloroacetyl N'-phenyl urea
N-chloroacetyl N'-tolyl thiourea
N-chloroacetyl N'-phenyl thiourea
N-chloroacetyl N'-chlorophenyl urea
N-chloroacetyl N,N'-diphenyl urea
Alpha-chloro beta-phenyl propionyl urea
N-(beta-chloro alpha-ethyl propionyl) N'-xylyl urea
N-(alpha-benzyl beta-bromo gamma-phenyl butyryl) N-benzyl thiourea
Alpha-chlorophenyl beta-chloro propionyl thiourea
Beta-cyclohexyl beta-bromo propionyl thiourea
N-(beta-chlorobutyryl) N,N'-diphenyl thiourea
N-chlorothionoacetyl N'-phenyl urea
N-bromothionoacetyl N'-tolyl urea
N-chlorothionoacetyl N'-phenyl thiourea Various hydrohalide acceptors may be employed. I prefer to use a hydrohalide acceptor that will react with the mercapto diazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diazine and the mono-halogenated acylated or thionoacylated urea or thiourea may be carried out in any suitable manner, but preferably is effected in the presence of a suitable solvent or mixture of solvents. Although various solvents and solvent mixtures may be employed, I prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

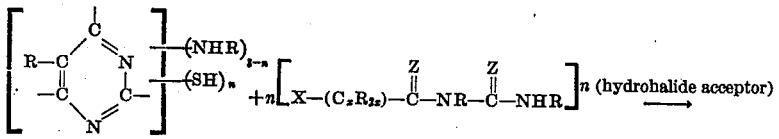

IV

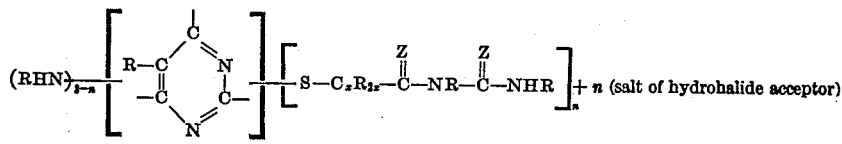

In the above equation X represents halogen and $n$, $x$, Z and R have the same meanings as given above with reference to Formula I.

The new chemical compounds of this invention also may be prepared by effecting reaction between a halogenated diazine and a mono-mercapto acylated or thionoacylated urea or thiourea in the presence of a hydrohalide acceptor. This reaction may be carried out by any suitable means but preferably is effected in the presence of an anhydrous solvent, e. g., alcohol. The other conditions of reaction may be the same as described above with reference to the first-mentioned method of preparation.

In order that those skilled in the art better may understand how the present invention may be carried into effect, the following illustrative examples are given. All parts are by weight.

*Example 1*

This example illustrates the preparation of 4,6-diamino pyrimidyl-2 thio acetyl urea, the formula for which is

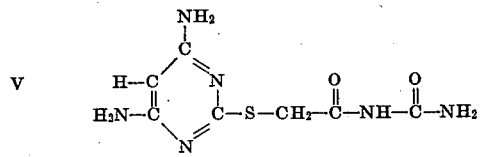

| | Parts |
|---|---|
| Chloroacetyl urea (melting point 186–188° C.) | 91.0 |
| 2-mercapto 4,6-diamino pyrimidine | 95.2 |
| Sodium hydroxide | 28.0 |

The 2-mercapto 4,6-diamino pyrimidine and sodium hydroxide were dissolved in 500 parts hot water, yielding a solution of the sodium salt of 2-mercapto 4,6-diamino pyrimidine. The chloroacetyl urea (monochloracetyl urea) was dissolved in 2,500 parts boiling water. The two solutions were mixed together while hot. An immediate formation of long, white, satin-like, glistening, needle-like crystals took place. The reaction mass was heated for 10 minutes and then cooled. The precipitated crystals comprising 4,6-diamino pyrimidyl-2 thio acetyl urea were removed by filtration, washed free of soluble salts and dried. The purified and dried product melted with decomposition at 213–215° C. It was soluble in benzyl alcohol, ethylene glycol monoethyl ether and in 10% sodium hydroxide solution, and was partially soluble in dioxane.

*Example 2*

2,6-diamino pyrimidyl-4 thio acetyl urea is prepared in essentially the same manner as described under Example 1 with the exception that 95.2 parts of 4-mercapto 2,6-diamino pyrimidine are used instead of 95.2 parts of 2-mercapto 4,6-diamino pyrimidine.

*Example 3*

4,6-di-(methylamino) pyrimidyl-2 thio acetyl urea is prepared in essentially the same manner as described under Example 1 with the exception that, instead of 2-mercapto 4,6-diamino pyrimidine, an aquivalent amount of 2-mercapto 4,6-di-(methylamino) pyrimidine is employed.

*Example 4*

4,6-diamino pyrimidyl-2 thio acetyl thiourea is prepared in essentially the same manner as described under Example 1 with the exception that, instead of chloroacetyl urea, an equivalent amount of chloroacetyl thiourea is used.

*Example 5*

4,6-diamino pyrimidyl-2 thio thionoacetyl urea is prepared in essentially the same manner as described under Example 1 with the exception that, instead of chloroacetyl urea, an equivalent amount of chlorothionoacetyl urea is employed.

*Example 6*

4,6-diamino pyrimidyl-2 thio thionoacetyl thiourea is prepared in essentially the same manner as described under Example 1 with the exception that, instead of chloroacetyl urea, an equivalent amount of chlorothionoacetyl thiourea is used.

As will be readily understood by those skilled in the art, when it is desired to produce compounds containing a single monoamino pyrimidyl grouping and two thio acetyl (or thionoacetyl) urea (or thiourea) groupings, or compounds containing a pyrimidyl grouping and three thio acetyl (or thionoacetyl) urea (or thiourea) groupings, then the starting reactants and proportions of reactants are chosen so as to yield the desired product in accordance with methods such as above given by way of illustration.

Other examples of the new chemical compounds of this invention are listed below:

Monoamino pyrimidyl di-(thio acetyl urea), including 6-amino pyrimidyl-2,4 di-(thio acetyl urea) and 2-amino pyrimidyl-4,6 di-(thio acetyl urea)
Monoamino pyrimidyl di-(thio acetyl thiourea)
Monoamino pyrimidyl di-(thio thionoacetyl urea)
Monoamino pyrimidyl di-(thio thionoacetyl thiourea)
Monoamino pyrimidyl di-(alpha-thio propionyl urea)
Monoamino pyrimidyl di-(beta-thio propionyl urea)
Monoamino pyrimidyl di-(alpha-thio propionyl thiourea)
Monoamino pyrimidyl di-(beta-thio propionyl thiourea)
Monoamino pyrimidyl di-(alpha-thio thionopropionyl urea)
Monoamino pyrimidyl di-(beta-thio thionopropionyl urea)
Monoamino pyrimidyl di-(alpha-thio thionopropionyl thiourea)
Monoamino pyrimidyl di-(beta-thio thionopropionyl thiourea)
Pyrimidyl-2,4,6 tri-(thio acetyl urea)
Pyrimidyl-2,4,6 tri-(thio acetyl thiourea)
Pyrimidyl-2,4,6 tri-(thio thionoacetyl urea)
Pyrimidyl-2,4,6 tri-(thio thionoacetyl thiourea)
Pyrimidyl-2,4,6 tri-(alpha-thio propionyl urea)
Pyrimidyl-2,4,6 tri-(beta-thio propionyl urea)
Pyrimidyl-2,4,6 tri-(alpha-thio propionyl thiourea)
Pyrimidyl-2,4,6 tri-(beta-thio propionyl thiourea)
Pyrimidyl-2,4,6 tri-(alpha-thio thionopropionyl urea)
Pyrimidyl-2,4,6 tri-(beta-thio thionopropionyl urea)
Pyrimidyl-2,4,6 tri-(alpha-thio thionopropionyl thiourea)
Pyrimidyl-2,4,6 tri-(beta-thio thionopropionyl thiourea)
Diamino pyrimidyl mono-(alpha-thio propionyl urea), including 4,6-diamino pyrimidyl-2 alpha-thio propionyl urea and 2,6-diamino pyrimidyl-4 alpha-thio propionyl urea Diamino pyrimidyl mono-(beta-thio propionyl urea)
Diamino pyrimidyl nono-(alpha-thio propionyl thiourea)
Diamino pyrimidyl mono-(alpha-thio thionopropionyl urea)
Diamino pyrimidyl mono-(beta-thio thionopropionyl urea)
Diamino pyrimidyl mono-(alpha-thio thionopropionyl thiourea)
Diamino pyrimidyl mono-(beta-thio thionopropionyl thiourea)
Diamino pyrimidyl mono-(beta-thio propionyl thiourea)
Diamino pyrimidyl mono-(alpha-thio valeryl urea)
Diamino pyrimidyl mono-(beta-thio valeryl urea)
Diamino pyrimidyl mono-(alpha-thio valeryl thiourea)
Diamino pyrimidyl mono-(beta-thio valeryl thiourea)
2,4-diamino 5-methyl pyrimidyl-6 thio acetyl urea
6-amino pyrimidyl-2,4 di-(alpha-thio butyryl urea)
6-amino pyrimidyl 2-(thio acetyl urea) 4-(beta-thio propionyl urea)
4-anilino 6-methylamino pyrimidyl-2 thio acetyl urea
4,6-diamino pyrimidyl-2 N-(beta-thio propionyl) N'-phenyl urea
4,6 - di - (methylamino) 5-phenyl pyrimidyl-2 beta-thio alpha-phenyl butyryl urea
5-methyl pyrimidyl-2,4,6 tri-(thio acetyl urea)
4,6 - di - (anilino) pyrimidyl - 2 N - (beta-thio gamma-cyclohexyl butyryl) N'-methyl thiourea
2,6-diamino 5-methyl pyrimidyl-4 N-(alpha-thio propionyl) N,N'-diphenyl urea
6-toluido 5-ethyl pyrimidyl-2,4 di-[N-(beta-thio valeryl) N'-benzyl urea]
2-methylamino 5-phenyl pyrimidyl-4,6 di-(beta-thio alpha-chlorophenyl thionopropionyl urea)
Pyrimidyl-2,4,6 tri-[N-(thio acetyl) N'-cyclohexyl urea]
5-phenyl pyrimidyl-2,4,6 tri-(beta-thio alpha-phenyl butyryl thiourea)
6-amino pyrimidyl-2,4 di-(alpha-thio thionobutyryl thiourea)
6-amino pyrimidyl 2-(thio acetyl urea) 4-(thio thionoacetyl urea)
4,6-diamino pyrimidyl-2 alpha-thio beta-fluorophenyl propionyl urea
2-6-diamino pyrimidyl-4 beta-thio alpha-bromopropyl propionyl thiourea
4,6 - di - (chloroethylamino) pyrimidyl-2 thio acetyl urea
2,6 - di - (fluoroanilino) pyrimidyl-4 alpha-thio propionyl urea
4,6-di-(iodotoluido) pyrimidyl-2 beta-thio propionyl thiourea
2,6 - di - (bromonaphthylamino) pyrimidyl - 4 alpha-thio butyryl urea
4,6 - diamino 5-chlorophenyl pyrimidyl-2 thio acetyl urea It will be understood, of course, by those skilled in the art that, in those compounds listed above that are generically named, the substituent groupings may be attached to any of the carbon atoms of the pyrimidine nucleus. For example, the expression "diamino pyrimidyl" includes both the 4,6-diamino pyrimidyl-2 and the 2,6-diamino pyrimidyl-4 (2,4-diamino pyrimidyl-6) derivatives.

In a manner similar to that described above with particular reference to the preparation of pyrimidyl (1,3-diazinyl) thio acyl and thio thionoacyl ureas and thioureas, corresponding derivatives of the 1,2-diazines and of the 1,4-diazines may be prepared.

What I claim as new and desire to secure by Letters Patent of the United States is:

1. Chemical compounds corresponding to the general formula

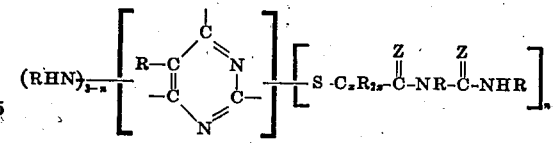

where $n$ represents an integer and is at least 1 and not more than 3, $x$ is an integer and is at least 1 and not more than 2, Z represents a member of the class consisting of oxygen and sulfur, and R represents a member of the class consisting of hydrogen and monovalent hydrocarbon and halo-hydrocarbon radicals.

2. Chemical compounds as in claim 1 wherein R represents hydrogen.
3. Chemical compounds as in claim 1 wherein $n$ is 3.
4. Chemical compounds as in claim 1 wherein $n$ is 2.
5. Chemical compounds as in claim 1 wherein $n$ is 1.
6. Chemical compounds as in claim 1 wherein R represents hydrogen and Z represents oxygen.
7. Chemical compounds as in claim 1 wherein R represents hydrogen and $x$ is 1.
8. Chemical compounds corresponding to the general formula

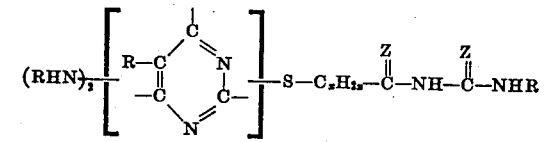

where $x$ is an integer and is at least 1 and not more than 2, Z represents a member of the class consisting of oxygen and sulfur, and R represents a member of the class consisting of hydrogen and monovalent hydrocarbon and halo-hydrocarbon radicals.

9. Chemical compounds corresponding to the general formua

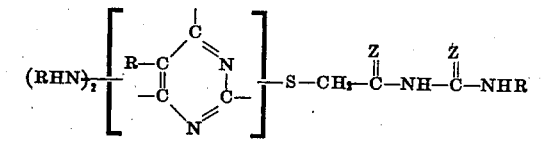

where Z represents a member of the class consisting of oxygen and sulfur, and R represents a member of the class consisting of hydrogen and monovalent hydrocarbon and halo-hydrocarbon radicals.

10. Pyrimidyl-2,4,6 tri-(thio acetyl urea).
11. A monoamino pyrimidyl di-(thio acetyl urea).
12. A diamino pyrimidyl thio acetyl urea.
13. 4,6-diamino pyrimidyl-2 thio acetyl urea.
14. The method of preparing chemical compounds corresponding to the general formula

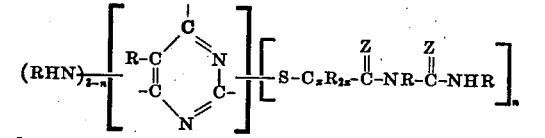

where $n$ represents an integer and is at least 1 and not more than 3, x is an integer and is at least 1 and not more than 2, Z represents a member of the class consisting of oxygen and sulfur, and R represents a member of the class consisting of hydrogen and monovalent hydrocarbon and halo-hydrocarbon radicals, said method comprising effecting reaction, in the presence of a hydrohalide acceptor, between (1) a mercapto diazine corresponding to the general formula

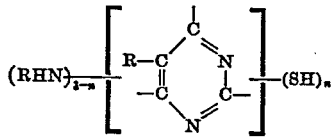

where $n$ and R have the meanings above given, and (2) a mono-halogenated compound corresponding to the general formula

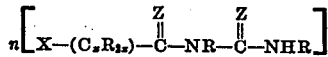

where X represents halogen, and $n$, $x$, Z and R have the meanings above given.

15. A method as in claim 14 wherein the hydrohalide acceptor is an alkali-metal hydroxide.

16. The method of preparing 4,6-diamino pyrimidyl-2 thio acetyl urea which comprises effecting reaction, in the presence of a hydrohalide acceptor, between 2-mercapto 4,6-diamino pyrimidine and chloroacetyl urea.

GAETANO F. D'ALELIO.

CERTIFICATE OF CORRECTION.

Patent No. 2,324,287.  July 13, 1943.

GAETANO F. D'ALELIO.

It is hereby certified that error appears in the printed specification of the above numbered patent requiring correction as follows: Page 2, first column, line 15, for "(cyclohexylamio)" read --(cyclohexylamino)--; line 33, for "4-cylohexenylamino" read --4-cyclohexenylamino--; line 41, for "fluoroaniline" read --fluoroanilino--; and second column, line 8, for "choloropropionyl" read --chloropropionyl--; page 3, first column, line 67, for "aquivalent" read --equivalent--; page 4, first column, line 3, for "nono-" read -- mono- --; line 55, for "2-6-diamino" read --2,6-diamino--; and that the said Letters Patent should be read with this correction therein that the same may conform to the record of the case in the Patent Office.

Signed and sealed this 31st day of August, A. D. 1943.

Henry Van Arsdale,
Acting Commissioner of Patents.

(Seal)